United States Patent [19]
Dahl et al.

[11] Patent Number: 5,710,938
[45] Date of Patent: Jan. 20, 1998

[54] DATA PROCESSING ARRAY IN WHICH SUB-ARRAYS ARE ESTABLISHED AND RUN INDEPENDENTLY

[75] Inventors: Curtis Wayne Dahl, Draper; Daniel Allen Neuss, Park City; Mark Steven Collett, Kaysville; Mark Elliot Bsharah, Sandy, all of Utah

[73] Assignee: Unisys Corporation, Blue Bell, Pa.

[21] Appl. No.: 504,303

[22] Filed: Jul. 19, 1995

[51] Int. Cl.⁶ .................................................. G06F 15/00
[52] U.S. Cl. ................................ 395/800.13; 395/800.15
[58] Field of Search .............................. 395/800, 200.01, 395/200.02, 200.15, 800.11, 800.13, 800.15

[56] References Cited

U.S. PATENT DOCUMENTS

| | | | |
|---|---|---|---|
| 5,113,523 | 5/1992 | Colley et al. | 395/800.13 |
| 5,129,077 | 7/1992 | Hillis . | |
| 5,175,865 | 12/1992 | Hillis . | |
| 5,404,562 | 4/1995 | Heller et al. | 395/800 |
| 5,465,380 | 11/1995 | Hamanaka et al. | 395/800 |
| 5,485,627 | 1/1996 | Hillis . | |
| 5,561,768 | 10/1996 | Smith | 395/800.13 |

OTHER PUBLICATIONS

Kessler et al., Cray T3D: A New Dimension for Cray Research, IEEE, pp. 176–182. Jan. 1993.

Hsieh, A mesh partitioning tool and its applications to Parallel processing, 1994, pp. 168–173.

Primary Examiner—William M. Treat
Assistant Examiner—Patrice L. Winder
Attorney, Agent, or Firm—Charles J. Fassbender; Mark T. Starr; Steven R. Petersen

[57] ABSTRACT

A data processing array is partitioned by electronic control signals into multiple sub-arrays which are established and operate independently of each other. In the preferred embodiment, an operator's console is provided for manually selecting the data processing nodes that are in each sub-array, and a control module is coupled by control channels between the console and the data processing nodes. These control channels carry the control signals directly to the data processing nodes without utilizing the input/output channels which are intercoupled to form the array. One portion of these control signals prevent each node in a sub-array from sending messages on the input/output channels to any node in another sub-array; and another portion of the control signals select a node in each sub-array as a boot node from which a separate operating system and user programs are loaded without utilizing the input/output channels.

12 Claims, 7 Drawing Sheets

FIG. 2A

COLUMN-ROW IN SUB-ARRAY 46

| | | | | | | |
|---|---|---|---|---|---|---|
| | | | 0,0 | 1,0 | 0,0 41 | 1,0 1,1 1,2 1,3 1,4 | 2,0 2,1 2,2 2,3 | 0,0 0,1 0,2 0,3 0,4 0,5 0,6 |
| 0,0 40 0,1 0,2 | 1,0 1,1 1,2 0,0 42 0,1 | 0,0 43 0,1 0,2 0,3 0,4 | 0,0 44 0,1 0,2 0,3 | 0,0 45 0,1 | 1,0 1,1 1,2 0,0 47 0,1 | 2,0 2,1 2,2 0,0 48 0,1 | 46 |

(Sub-array 46 box: 0,6)

FIG. 2B

COLUMN-ROW IN SUB-ARRAY 55

| | | | | |
|---|---|---|---|---|
| | 0,0 0,1 0,2 0,3 0,4 0,5 | 0,0 52 0,1 0,2 | 1,0 1,1 1,2 1,3 1,4 1,5 | 2,0 2,1 2,2 2,3 2,4 2,5 |
| 0,0 0,1 0,2 0,3 50 0,4 0,5 0,6 0,7 0,8 | | 1,0 1,1 1,2 1,3 51 1,4 1,5 | 0,0 0,1 0,2 0,3 53 0,4 0,5 0,6 | 1,0 1,1 1,2 1,3 1,4 1,5 1,6 |
| | | 0,0 0,1 0,2 54 0,3 0,4 0,5 0,6 | 0,0 0,1 0,2 55 | 1,0 1,1 1,2 |

(Sub-array 55 box: 1,2)

FIG. 2C

PHYSICAL LOCATION IN ARRAY 11

| | | | |
|---|---|---|---|
| 1A0 | 1A1 | 1A2 | 1A3 |
| 1A4 | 1A5 | 1A6 | 1A7 |
| 1A8 | 1A9 | 1A10 | 1A11 |
| 1A12 | 1A13 | 1A14 | 1A15 |
| 1B0 | 1B1 | 1B2 | 1B3 |
| 1B4 | 1B5 | 1B6 | 1B7 |
| 1B8 | 1B9 | 1B10 | 1B11 |
| 1B12 | 1B13 | 1B14 | 1B15 |
| 1C0 | 1C1 | 1C2 | 1C3 |
| 1C4 | 1C5 | 1C6 | 1C7 |
| 1C8 | 1C9 | 1C10 | 1C11 |
| 1C12 | 1C13 | 1C14 | 1C15 |
| 1D0 | 1D1 | 1D2 | 1D3 |
| 1D4 | 1D5 | 1D6 | 1D7 |
| 1D8 | 1D9 | 1D10 | 1D11 |
| 1D12 | 1D13 | 1D14 | 1D15 |

(Array 11 box: 1D15)

DATA PROCESSING ARRAY IN WHICH SUB-ARRAYS ARE ESTABLISHED AND RUN INDEPENDENTLY

BACKGROUND OF THE INVENTION

This invention relates to the field of data processing arrays; and more particularly, it relates to methods and circuits by which the data processing nodes in such an array are electronically partitioned into multiple sub-arrays which are established independently of each of other and operate independently of each other.

In the prior art, several types of data processing arrays have been described. For example, U.S. Pat. No. 4,933,933 describes a data processing array in which multiple data processing nodes are intercoupled by message routing circuits and input/output channels that are disposed in rows and columns in a single plane. By comparison, U.S. Pat. No. 5,175,733 describes a data processing array in which multiple data processing nodes are intercoupled by message routing circuits and input/output channels that are disposed in rows and columns which lie in several parallel planes. Also, U.S. Pat. No. 4,814,980 describes another data processing array in which multiple data processing nodes are intercoupled by message routing circuits and input/output channels which form an n-dimensional cube called a hypercube. Further, U.S. Pat. No. 5,170,482 describes a data processing array wherein multiple data processing nodes are intercoupled by message routing circuits and input/output channels that form a modified hypercube in which additional input/output channels are provided between the most distant nodes.

One advantage of a data processing array over a single large computer is that the array provides a scalable amount of computing power. To increase the computing power of the array, any number of data processing nodes can physically be added to the array. Also, anther advantage of a data processing array is that provides computing power which is failsoft. This means that one or more data processing nodes in the array can fail while the remaining nodes in the array continue to operate.

But the present inventors have found that a major drawback with the data processing arrays of the prior art is that the arrays cannot be partitioned into multiple sub-arrays which are established independently of each other and which operate independent of each other. According to the present inventors, such independent partitioning is desirable because each sub-array could then load and run separate operating systems and separate user programs without any interaction with the other sub-arrays; and this, in turn, would greatly increase the usefulness of overall array. For example, one sub-array could run with a shared data base operating system in which user program share common files; another sub-array could run a compiler operating system in which user programs are translated from a source language to machine code; another sub-array could run a secret technological program, etc.

However, in order for each sub-array to be completely independent of the other sub-arrays, methods and circuits need to be provided which enable each sub-array to be established without sending any control signals or messages through the data processing nodes, message routing circuits, and input/output channels which lie outside of that sub-array. Further, in order for each sub-array to be completely independent of the other sub-arrays, methods and circuits must be provided which enable an operating system and user programs to be loaded into each particular sub-array without sending any control signals or messages through the data processing nodes, message routing circuits, and input/output channels of the other sub-arrays. Also, in order for the sub-arrays to be completely independent of each other, methods and circuits must be provided by which the operating systems and user programs within each sub-array are restricted such that any messages which are sent from the data processing nodes in any one sub-array never cross the sub-array boundary.

Now in the above-cited patents, no such methods and circuits are described. Likewise, in each of the following U.S. patents which relate to data processing arrays, methods and circuits for partitioning the array into multiple independent sub-arrays are not described. Instead, the following patents merely describe various methods and circuits by which messages are routed through the message routing circuits and input/output channels from one data processing node to another.

| | |
|---|---|
| 5,353,283 | GENERAL INTERNET METHOD FOR ROUTING PACKETS IN A COMMUNICATIONS NETWORK |
| 5,347,450 | MESSAGE ROUTING IN A MULTIPROCESSOR COMPUTER SYSTEM |
| 5,223,968 | FIRST COME ONLY SERVED COMMUNICATIONS NETWORK |
| 5,181,017 | ADAPTIVE ROUTING IN A PARALLEL COMPUTING SYSTEM |
| 5,170,393 | ADAPTIVE ROUTING OF MESSAGES IN PARALLEL AND DISTRIBUTED PROCESSOR SYSTEMS |
| 5,168,572 | SYSTEM FOR DYNAMIC SELECTION OF GLOBALLY-DETERMINED OPTIMAL DATA PATH |
| 5,008,882 | METHOD AND APPARATUS FOR ELIMINATING UNSUCCESSFUL TRIES IN A SEARCH TREE |
| 4,905,233 | MULTIPLE PATH ROUTING MECHANISM FOR PACKET COMMUNICATIONS NETWORK |

Further, in a commercially available data processing array called the Paragon™ which is sold by Intel Corporation, such independent partitioning of the data processing arrays into multiple sub-arrays does not occur. Instead, the Paragon™ data processing array has one large "root partition" which includes all of the data processing nodes in the entire array. Within that root partition, several smaller "compute" partitions for user programs can be established only under control of the root partition which sends messages on all of input/output channels. Thus, the root partition and the compute partitions together are a hierarchical structure in which the root is an administrator that can do anything to any compute partition at any time.

BRIEF SUMMARY OF THE INVENTION

In accordance with present invention, a data processing array is partitioned by electronic control signals into multiple sub-arrays which are established and operate independently of each other. By this partitioning, the data processing nodes in each sub-array are restricted such that all messages from any one sub-array address data processing nodes within, but not outside of, that one array. In the preferred embodiment, an operator's console is provided for manually selecting the data processing nodes that are in each sub-array, and a control module is coupled by control channels between the console and the data processing nodes. These control channels carry the control signals directly to the data processing nodes without utilizing the input/output channels which are intercoupled to form the array. One portion of these control signals prevent each node in a sub-array from sending messages on the input/output channels to any node in another sub-array; and another portion of the control signals select a node in each sub-array as a boot node. In each sub-array, the boot node loads a separate operating system and user programs via a peripheral device which is coupled directly to the boot node.

BRIEF DESCRIPTION OF THE DRAWINGS

FIGS. 2A and 2B respectively show two different sets of partitions for an array in the FIG. 1 embodiment which are electronically established by control signals from a control module in the FIG. 1 embodiment.

FIG. 2C shows the physical location of the data processing nodes in the partitions of FIGS. 2A and 2B.

DETAILED DESCRIPTION OF THE DRAWINGS

Figure 1:
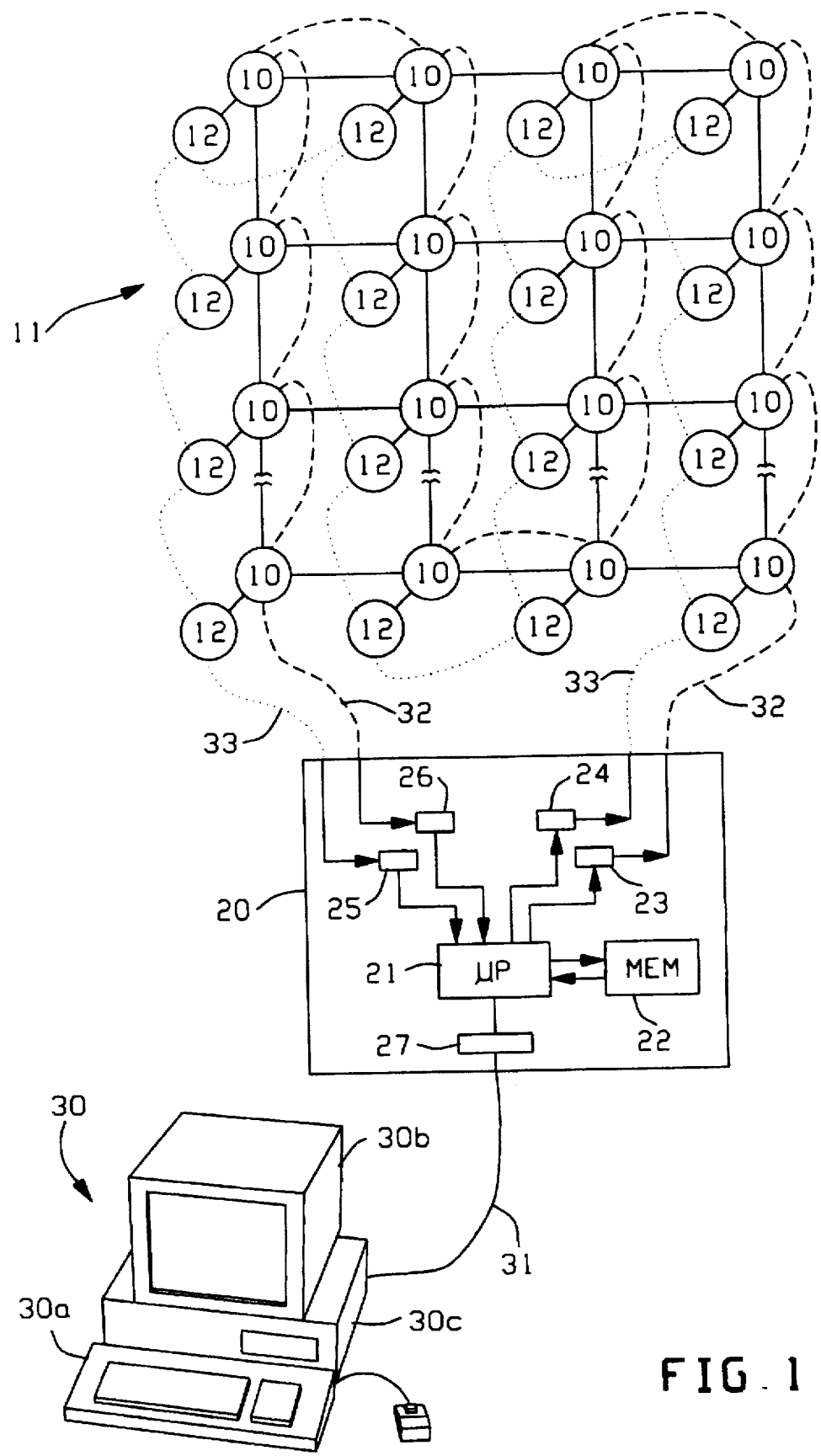
FIG. 1 shows one preferred embodiment of the present invention.

With reference now to FIG. 1, a preferred embodiment of a data processing system which is structured in accordance with the present invention will be described. This FIG. 1 embodiment includes a plurality of message routing circuits 10 which have input/output channels that are intercoupled to form an array 11; and it also includes a corresponding plurality of data processing nodes 12, each of which has an input/output channel to a respective message routing circuit. In FIG. 1, each message routing circuit 10 and each data processing node 12 is symbolically represented by a circle; and each input/output channel is symbolically represented by a solid line which interconnects a message routing circuit 10 to its respective data processing node 12 or an adjacent message routing circuit.

In actuality, each data processing node 12 includes a general purpose microprocessor for executing any type of software program, and it includes a memory for storing the program. Also, each data processing node further includes a selectable number of peripheral input/output devices such as a disk, a tape, a keyboard, a CRT display, etc. By comparison, each message routing circuit 10 merely contains special purpose circuits which route messages from one data processing node to another. That is, the microprocessor in each data processing node 12 sends messages on the node's input/output channel which addresses other data processing nodes, and the message routing circuits pass those messages on the input/output channels to the addressed data processing nodes.

Also included in the FIG. 1 embodiment is a control module 20 which contains several components 21–27. Component 21 is a microprocessor; component 22 is a memory; components 23 and 24 are parallel-to-serial shift registers; components 25 and 26 are serial-to-parallel shift registers; and component 27 is a console interface circuit. All of the components 21–27 are interconnected within the control module 20 as shown. Then, to complete the FIG. 1 embodiment, it includes an operator's console 30 which contains a keyboard 30a, a visual display 30b, and microprocessor 30c. One bit-serial control channel 31 couples the console 30 to the control module 20; and two other bit-serial control channels 32 and 33 couple the control module to the array 11.

From the keyboard 30a, an operator manually enters commands which are performed by interaction between the console microprocessor 30c, the control module microprocessor 21, the message routing circuits 10, and the data processing nodes 12. As part of that interaction, the microprocessor 21 selectively sends control signals on the bit serial control channels 32 and 33 to the message routing circuits 10 and the data processing nodes 12; and these control signals electronically partition the array 11 into multiple independent sub-arrays. Each sub-array includes a subset of the message routing circuits 10 which are adjacent to each other in the array 11 and their respective data processing nodes. Each sub-array is independent of the other sub-arrays because the messages which originate within any one particular sub-array cannot travel to data processing nodes in any other sub-array.

Some specific examples of how the array 11 is partitioned via the console 30 and control module 20 are shown in FIGS. 2A and 2B. In FIG. 2A, the array 11 is partitioned into nine sub-arrays 40–48; whereas in FIG. 2B, the array 11 is repartitioned into six sub-arrays 50–55. Sub-array 40 is three rows by two columns; sub-array 41 is five rows by two columns; sub-array 42 is eight rows by one column; etc. By the control signals which the control module 20 sends to the array 10, the number of rows and number of columns in each sub-array can be selected such that the sub-array has an optimal size for the particular type of programs which that sub-array is going to execute.

Due to the above partitioning, the data processing nodes within each sub-array run respective programs without interfering with the programs on any other sub-array. For example, each node 10 within one sub-array can run user programs which share a common data base; each node 10 within a second sub-array can compile user programs; each node 10 within a third sub-array can be used to de-bug experimental user programs; etc.

Within each sub-array, one particular data processing node has a column-row address of 0,0; and that data processing node is located at the upper left corner of the sub-array. All other data processing nodes within each sub-array have a column-row address relative to the data processing node with the 0,0 address in the same sub-array. For example, the data processing node which has address 1,2 in the sub-array 40 is located one column to the right and two rows down from the data processing node in sub-array 40 with the 0,0 address. Likewise, in the sub-array 44, the data processing node with address 2,3 is located two columns to the right and three rows down from the data processing node in sub-array 44 with the 0,0 address.

By comparison, in FIG. 2C, each data processing node 12 in the array 11 is identified by its physical location within the array 11. This physical location is of the form C-B-S, where "C" identifies a cabinet, "B" identifies a backplane in the cabinet, and "S" identifies a slot for a printed circuit board which connects to the backplane. For example, the data processing node which has a C-B-S location of 1A0 is located in cabinet 1, backplane A, slot 0. Similarly, the data processing node which has a physical C-B-S of 1D2 is located in cabinet 1, backplane D, slot 2.

In order to correlate the column-row address of a data processing node within any sub-array to its corresponding physical location in the array 11, one need only select corresponding nodes from the FIGS. 2A, 2B and 2C. For example, in sub-array 46 of FIG. 2A, the data processing node with a column-row address of 0,6 corresponds to the data processing node in FIG. 2C at location 1D15. Likewise, in sub-array 55 of FIG. 2B, the data processing node with a column-row address of 1,2 corresponds to the same data processing node at location 1D15.

Now, with reference to FIGS. 3 and 4A–4C, additional details of the process by which the array 11 is partitioned into multiple independent sub-arrays will be described. To illustrate these process details, the steps for defining the sub-array 53 of FIG. 2B will be explained as an example.

Figure 3:
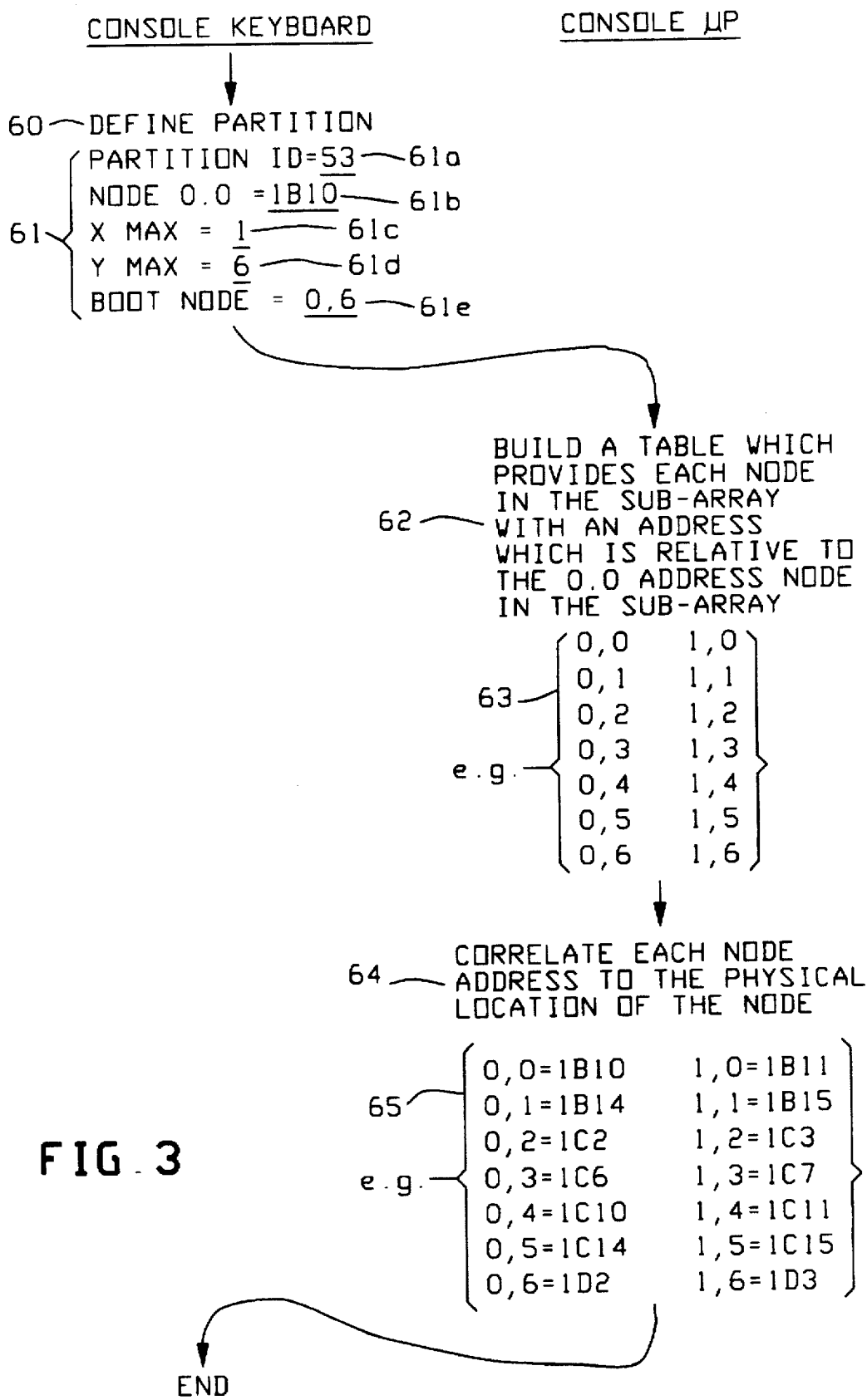
FIG. 3 shows a set of steps by which one of the partitions in FIG. 2B is defined.

As an initial step in FIG. 3, an operator at the console 30 uses the keyboard 30a to type in a "define partition" command. This is illustrated as step 60. In response, the visual display 30b on the console 30 displays all of the items which are indicated in FIG. 3 by reference numeral 61. Then, on the underlining which occurs after each of the items 61, the operator of the console 30 uses the keyboard 30a to make various entries which define the sub-array 53; and these entries are identified by reference numerals 61a–61e.

Entry 61a gives the partition an identification number (i.e. #53). Entry 61b assigns a physical location (i.e. 1B10) to the data processing node in sub-array 53 which has the column-row address of 0,0. Entry 61c assigns a "X MAX" coordinate to the sub-array 53; and entry 61d assigns a "Y MAX" coordinate to the sub-array 53. These coordinates X MAX and Y MAX correspond to the column-row address of the data processing node in the sub-array 53 which is furthest from the data processing node with the 0,0 address.

Lastly, item 61e defines the row-column address of the data processing node in sub-array 53 which will subsequently be utilized as a "bootstrap" node. This bootstrap node includes a peripheral device, such as a disc, from which an operating system will be loaded into the sub-array 53 and from which user programs will be loaded into the sub-array 53.

After the entries 61a–61e are made, the console microprocessor 30c builds a table which provides each node in sub-array 53 with an address that is relative to the node in sub-array 53 which has the 0,0 address. This step is indicated in FIG. 3 by reference numeral 62; and the resulting table which is built is shown by reference numeral 63. Then, the console microprocessor 30c correlates the address of each node in sub-array 53 to the physical location of the node. This step is indicated in FIG. 3 by reference numeral 64; and the resulting correlation which is made is indicated by reference numeral 65.

Figure 4A:
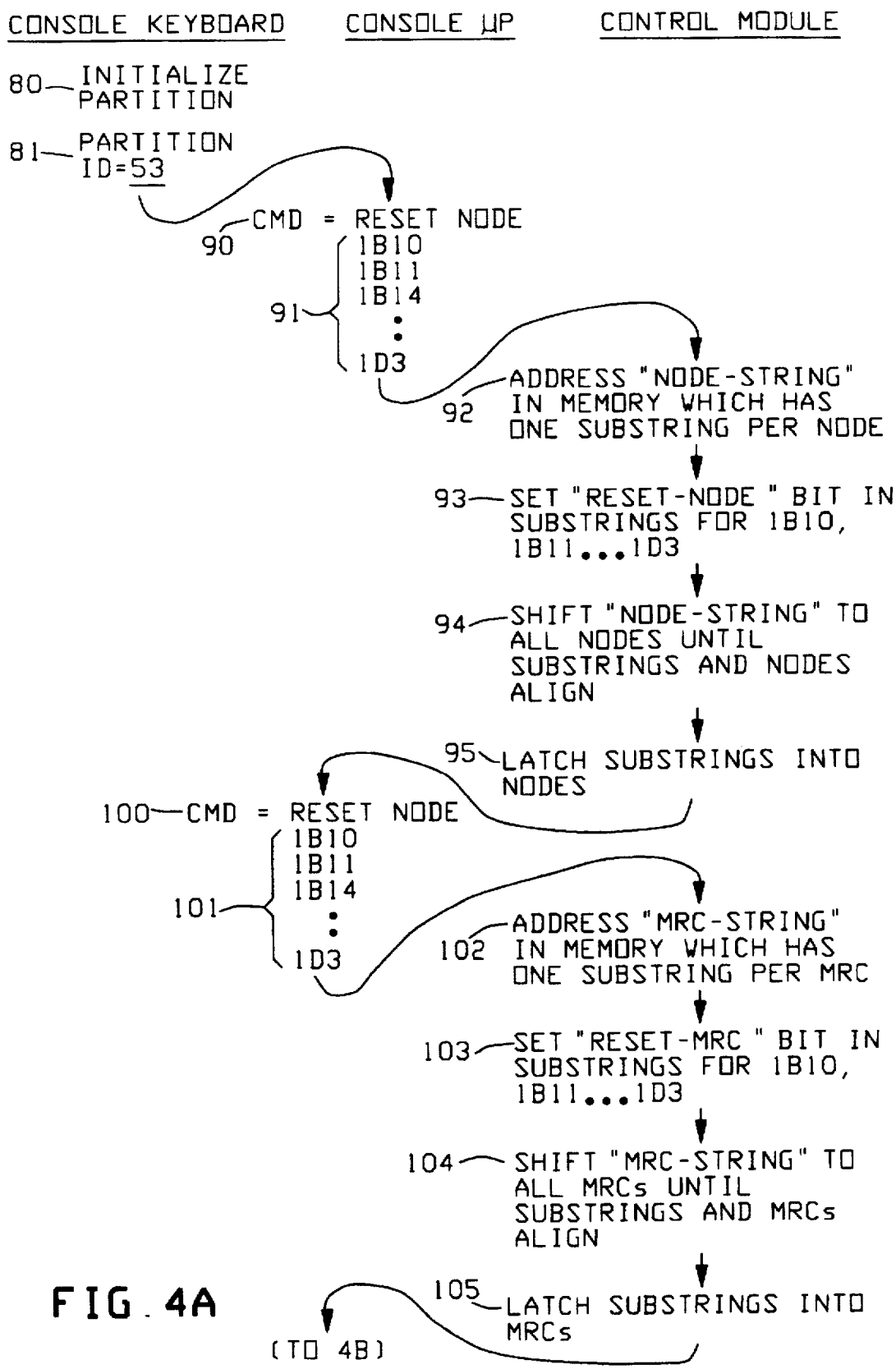
FIGS. 4A–4C show a set of steps by which the partition as defined in FIG. 3 is actually established without sending any control signals or messages through the data processing nodes, message routing circuits, and input/output channels which lie outside of that partition.

Next, the operator at the console 30 uses the keyboard 30a to type in a "initialize partition" command. This is indicated in FIG. 4A as step 80. In response, the visual display 30b on the console 30 displays item 81 which asks for the identification of the partition which is to be initialized. Then, the operator responds by typing a 53 over the underlining in item 81. In response, a series of interactions occur between the console microprocessor 30c, the control module 20, the data processing nodes 12, and the message routing circuits 10; and these interactions are illustrated as steps 90–180 in FIGS. 4A–4C.

In step 90, the console microprocessor 30c sends a "reset node" command over the control channel 31 to the control module 20. That command is then followed by a list 91 of the physical locations of the data processing nodes which are to be reset. List 91, for the sub-array 53, consists of the nodes at the physical locations 1B10, 1B11, 1B14 . . . 1D3.

In response to the reset node command 90 and the list 91, the microprocessor 21 in the control module 20 performs steps 92–95. By step 92, the microprocessor 21 addresses a "node string" which is stored in the memory 22 of the control module. This node string has one substring per node, and the substrings are ordered such that they follow each other in the same sequence which the control channel 33 passes from one data processing node 12 to another. Thus, the substring for node 1D15 follows the substring for node 1D11; the substring for node 1D11 follows the substring for node 1D7; etc.

Each node substring contains a predetermined number of bits; and each bit is interpreted by the corresponding data processing node in a predetermined fashion. In one embodiment, the substring for each data processing node contains seventy-two bits; and a particular one of those bits is defined as a "reset node bit" which causes the node to enter a predefined reset state. In step 93, this reset node bit is set in the substrings for the nodes which are identified in the list 91.

Thereafter, in step 94, the control module microprocessor 21 uses the control channel 33 to shift the entire node string serially through all of the data processing nodes 12 until each substring aligns with its corresponding node. Then, by step 95, each node substring is latched into its respective data processing node.

This node string, which was addressed by step 92, is maintained in memory 22 of the control module 20 as an image of the substrings which were last stored in all of the data processing nodes 12. Consequently, when the substrings are latched by step 95 into their respective data processing nodes, the present state of all nodes which lie outside of the sub-array 53 is not changed.

Following step 95, the console microprocessor 30c sends a "reset MRC command" to the control module 20; and this is indicated as step 100. That reset MRC command is then followed by a list 101 which gives the physical location of the message routing circuits that are to be reset. Then, in response to the reset MRC command and the list 101, the microprocessor 21 in the control module 20 performs steps 102–105.

In step 102, the microprocessor 21 addresses a "MRC string" in the memory 22. This MRC string has one substring per message routing circuit; and the substrings are ordered in the same sequence which the control channel 32 passes through the message routing circuits 10. Thus, the substring for the message routing circuit at location 1D15 follows the substring for the message routing circuit at location 1D11; the sub-string for the message routing circuit at location 1D11 follows the substring for the message routing circuit at location 1D7; etc.

Each MRC substring consists of a predetermined number of bits; and each of these bits is given a predetermined meaning. One such bit is designated a "reset MRC" bit which causes the MRC to enter a predefined reset state. In step 103, that reset MRC bit is set in the substrings for the message routing circuits 10 which lie within sub-array 53.

In step 104, the microprocessor 21 of the control module 20 uses the control channel 32 to serially shift the MRC string through all of the message routing circuits 10 until each substring aligns with its corresponding message routing circuit. Then, in step 105, the microprocessor 21 causes each MRC substring to be latched into its respective message routing circuit. Here, the message routing circuits 10 which lie outside of the sub-array 53 maintain their present state of operation because the MRC string in the memory 22 is as an image of the substrings which were last stored in the message routing circuits.

Figure 4B:
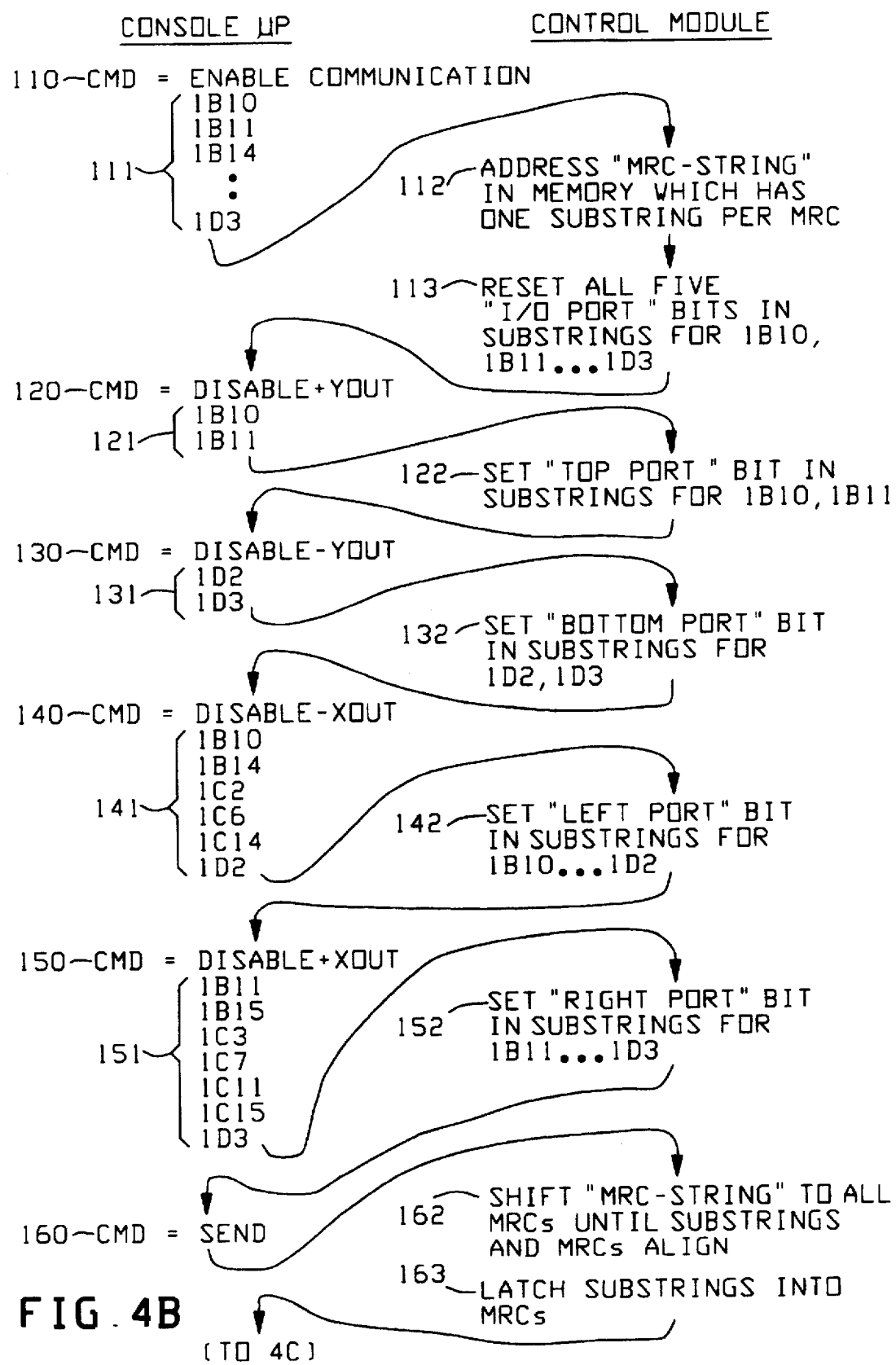

Next, by the steps in FIG. 4B, control signals are sent to the message routing circuits 10 in sub-array 53 which enable messages to be sent between any two data processing nodes within the sub-array 53, and prevent messages from being sent past the sub-array boundary. Initially, in step 110, the console microprocessor 30c sends an "enable communication" command to the microprocessor 21 in control module 20. That command is followed by a list 111 which identifies the locations of all of the message routing circuits in the sub-array 53.

In response, in step 112, the control module microprocessor 21 addresses the MRC string in the memory 22. Then, in step 113, five "I/O port" bits are reset in the substrings for the MRCs in list 111. These five I/O port bits respectively correspond to the top I/O port, the bottom I/O port, the left I/O port, the right I/O port, and the I/O port to a data processing node as illustrated in the message routing circuits 10 of FIG. 1.

By resetting one particular I/O port bit, the corresponding I/O port is enabled; whereas by setting that bit, the corresponding I/O port is disabled. When an I/O port is enabled, messages can be sent from that port to the input/output channel. Conversely, when an I/O port is disabled, messages are inhibited from leaving that port; and any attempt to send a message from that port causes an error status bit is stored within the message routing circuit. That error status bit can subsequently be read by the control module 20 and sent to the console display 30b via the control channels 31 and 32.

Next, by step 120, the console microprocessor 30c sends a "disable +Yout" command to the control module 20. Here, +Yout refers to the top port of a message routing circuit because messages pass out of the top port in a +Y direction. Then, in step 121, the console microprocessor 30c sends a list to the control module 20 which identifies the physical location of the message routing circuits to which the preceding command applies. In response, the control module microprocessor 21 addresses the substrings for the message routing circuits which are in the list 121, and it sets the I/O port bit which corresponds to the top port in those message routing circuits.

Similarly, by step 130, the console microprocessor 30c sends a disable "−Yout" command to the control module 20. Here, −Yout refers to the bottom port of a message routing circuit because messages pass out of the bottom port in a −Y direction. Then, in step 131, the console microprocessor 30c sends a list to the control module 20 which gives the physical location of the message routing circuits to which the preceding command applies. In response, the control module microprocessor 21 addresses the substrings for the message routing circuits which are in the list 131, and it sets the I/O port bit which corresponds to the bottom port in those message routing circuits.

Likewise, by step 140, the console microprocessor 30c sends a "disable −Xout" command to the control module 20. Here, −Xout refers to the left I/O port of a message routing circuit because messages pass out of the left port in a −X direction. Then, in step 141, the console microprocessor 30c sends a list to the control module 20 which gives the physical location of the message routing circuits to which the preceding command applies. In response, the control module microprocessor 21 addresses the substrings for the message routing circuits which are in the list 141, and it sets the I/O port bit which corresponds to the right port in those message routing circuits.

Lastly, by step 150, the console microprocessor 30c sends a "disable +Xout" command to the control module 20. Here, +Xout refers to the right I/O port of the message routing circuit because messages pass out of the right port in a +X direction. Then, in step 151, the console microprocessor 30c sends a list to the control module 20 which gives the physical location of the message routing circuits to which the preceding command applies. In response, the control module microprocessor 21 addresses the substrings for the message routing circuits which are in the list 151, and it sets the I/O port bit which corresponds to the right port in those message routing circuits.

Thereafter, in step 160, the console microprocessor 30c transmits a "send" command to the control module 20. In response, the control module microprocessor 21 uses the control channel 32 to shift the entire MRC string serially through the message routing circuits 10 until each substring aligns with its corresponding message routing circuit. This achieved by step 162. Then, in step 163, the control module microprocessor 21 causes each MRC substring to be latched into the message routing circuit with which it is aligned.

Figure 4C:
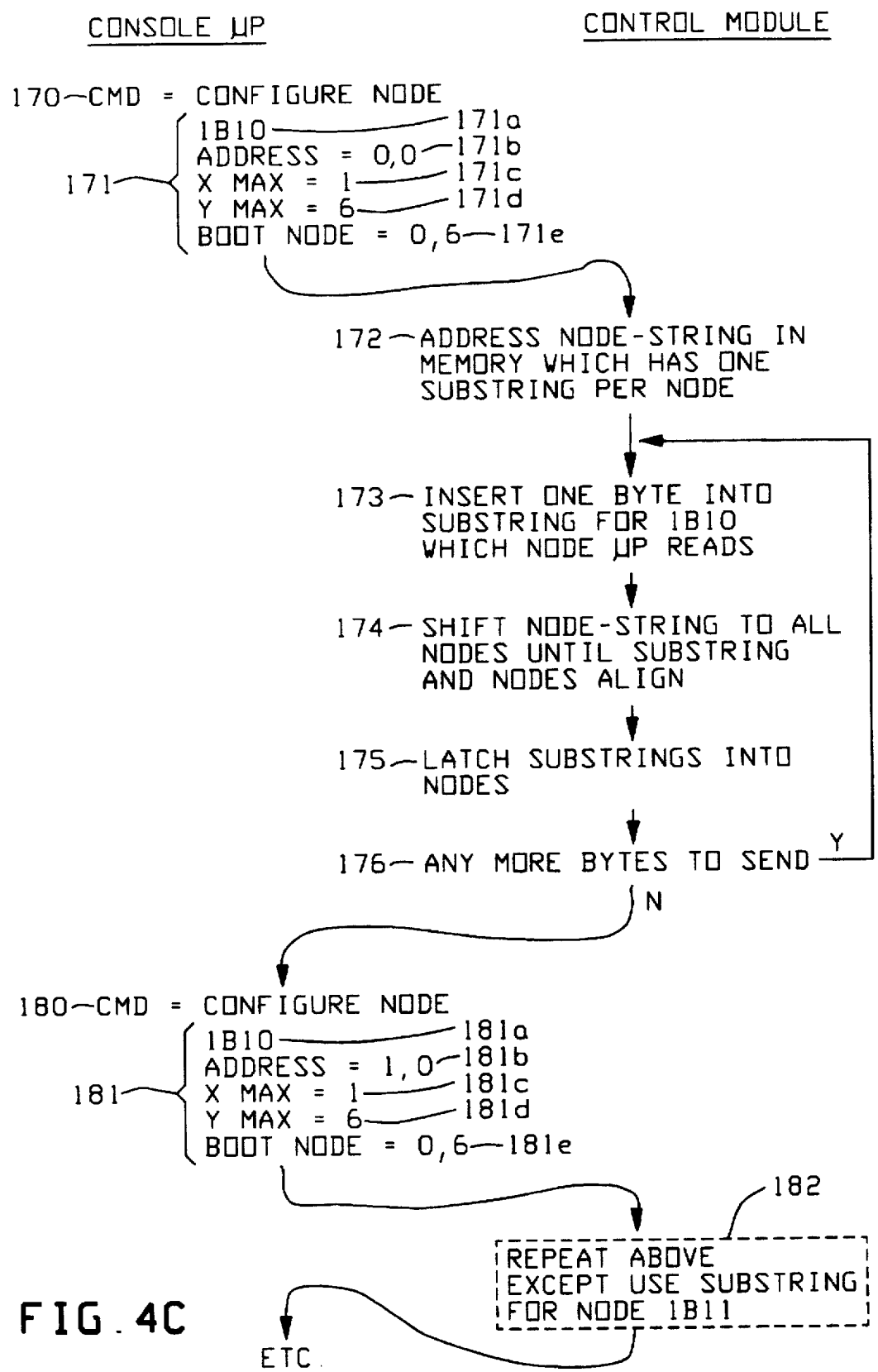

Next, by the steps of FIG. 4C, control signals are sent to the data processing nodes 12 in the sub-array 53 which inform each node of the size of the sub-array and of their location within the sub-array. Initially, in step 170, the console microprocessor 30c sends a "configure node" command to the control module 20. Following that command, a list 171 of several items is sent which supplements the command.

Item 171a is the physical location of the data processing node to which the configure node command applies. Item 171b is the address in sub-array 53 which is being assigned to the node in item 171a. Items 171c and 171d respectively give the column-row address of the data processing node in sub-array 53 which is furthest from the data processing node which has address 0,0. Item 171e gives the column-row address of the data processing node in sub-array 53 which will operate as the boot node.

Thereafter, by steps 172–176, the control module microprocessor 21 sends all of the items 171b–171e to the data processing node which is identified in item 171a. This information is sent by the microprocessor 21 over the control channel 33, one byte at a time.

In step 172, the control module microprocessor 21 addresses the node string which is maintained in the memory 22. Then, step 173, one byte of the data from items 171b–171e is inserted into the one particular substring which is for the data processing node at location 1B10. Then, by steps 174 and 175, the entire node string is shifted through all of the nodes in the array 11 until the one byte of data which was inserted into the substring for node 1B10 is aligned with that data processing node. Then, by step 175, the microprocessor 21 causes each substring to be latched into its respective data processing node.

In response, the data processing node at location 1B10 reads the one byte of data that was inserted into its substring in step 173. That byte is then stored, in the node at location 1B10, for future use. By comparison, the present state of all data processing nodes other than the node at location 1B10, is not changed; and this is because the node string in memory 22 is an image of the substrings which were last stored in the data processing nodes.

These steps 173–175 are repeated until all of the data in items 171b–171e has been sent to the data processing node at location 1B10. Thereafter, for each data processing node in the sub-array which is being configured, a similar set of steps is performed. This is illustrated in FIG. 4C wherein steps 180, 181 and 182 are performed for the data processing node at location 1D11. Step 180 is similar to step 170. Step 181 is similar to step 171, except that item 181a indicates that the configure node command is for the node at location 1B11; and item 181b indicates that a sub-array address of 1,0 is being assigned to the data processing node at location 1B11. Step 182 is similar step 172–176, except that the substring for node 1B11 is modified one byte at a time instead of the substring for node 1B10.

After the steps of FIG. 4C have been performed on each data processing node within the sub-array 53, an operating system is loaded via the boot node into the sub-array. Then, user programs are loaded into the sub-array and run in conjunction with the operating system. This is illustrated in FIG. 5.

Figure 5:
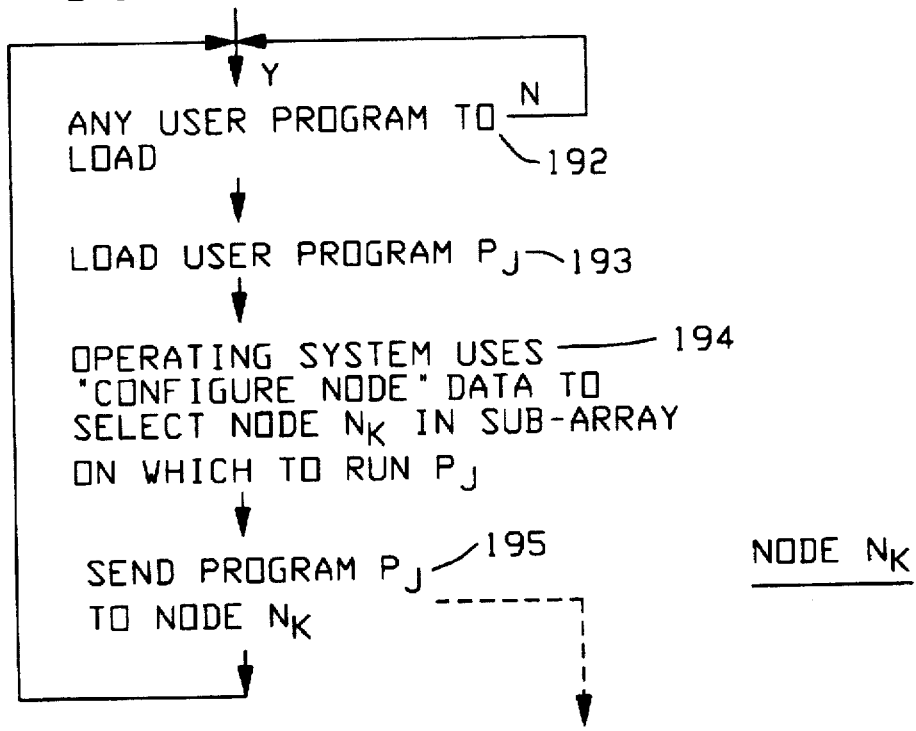
FIG. 5 shows a set of steps by which an operating system and user programs are loaded and run in the partition which is established in FIGS. 4A–4C without sending any control signals or messages through the data processing nodes, message routing circuits, and input/output channels of another partition.

Initially, in step 190 of FIG. 5, the boot node within a sub-array loads an operating system. Then, in step 191, the operating system examines the items which describe the sub-array that were previously stored in the node by the configure node command. Utilizing that sub-array data, the operating system is able to distribute itself to each node with the sub-array.

To send a message from the boot node to any one particular node within the sub-array, the message is given an address which is equal to the column-row address of that one particular node minus the column-row address of the boot node. For example, a message address of 0,–6 is used to send a message from the boot node whose column-row address is 0,6 to the node whose column-row address is 0,0. Similarly, a message address of 1,0 is used to send a message from the boot node whose column-row address is 0,6 to the node whose column-row address is 1,6.

Thereafter, the operating system on the boot node waits for a user program to be loaded. This is indicated in FIG. 5 as step 192. Then, as each user program is loaded, the operating system selects a node in the sub-array on which the user program can run. This is indicated in FIG. 5 as steps 193 and 194. Then, the operating system sends the user program as a message on the input/output channels to the node in the sub-array which it has selected for running the program. This is indicated as step 195.

When a data processing node receives a user program which is to be executed, the operating system at that node sends messages to each other node in the sub-array asking for the names of shared files and/or callable processes which the program can use. This is indicated in FIG. 5 by step 200. To send these messages, the operating system on the node which will run the user program uses the data which was previously stored in that node by the configure node command. Here again, a message is sent from the node which will run a user program to any other particular node within the sub-array by subtracting the column-row address of the source node from the column-row of the destination node.

Each node which receives a message in step 200 responds by sending a message back to the node which sent the message in step 200. Then, based on those responses, the operating system in the node which receives the responses generates a table which correlates the addresses of each node in the sub-array to the shared files and/or callable processes for the user program. This is indicated as step 201. Then, execution of the user program can begin as is indicated by step 202.

One feature of the above-described data processing system is that each partition is made without sending messages on any of the input/output channels. Instead, each partition is made by sending control signals over the bit-serial control channels 32 and 33; and these control signals go directly to the data processing nodes and message routing circuits which lie within the partition that is being established. Consequently, all of the data processing nodes and message routing circuits and input/output channels which lie outside a of partition that is being established are completely unaffected.

Another feature of the above-described data processing system is its versatility. By the define partition command of FIG. 3 and the initialize partition command of FIGS. 4A–4C, the array 11 is partitioned into a wide range of sub-arrays which vary in size. This enables the size of each sub-array to be tailored to the type of user programs which it is to execute.

Still another feature of the above-described data processing system is that in each sub-array, a separate boot node is provided. Consequently, an operating system and user programs are loaded into each particular sub-array without interfering or interacting with the data processing nodes and message routing circuit which lie outside of that sub-array.

Yet another feature of the above-described data processing system is that each node within a particular sub-array stores the size of that sub-array and stores its column-row address within that sub-array. By utilizing that information, each data processing node limits the addresses in the messages which it sends on the input/output channels such that the messages never cross the boundary of the sub-array in which the node resides.

An additional feature of the above-described data processing system is that each sub-array operates as a completely separate data processing system. This is evident from the example which was previously given wherein each node 10 within one sub-array has user programs which shared a common database; each node 10 within a second sub-array compiles user programs; each node 10 within a third sub-array is used to debug experimental user programs, etc. In each sub-array, the programs are loaded and run without any interaction the other sub-arrays.

Still another feature of the above-described data processing system is that security among the sub-arrays is very high. This high security is achieved because each particular sub-array is established and operates without any messages or control signals being sent via the data processing nodes or message routing circuits or input/output channels which lie outside of that particular sub-array. Consequently, each sub-array is suitable for running programs for different users which are classified or require their data to be kept secret.

One preferred embodiment of a data processing system which is structured in accordance with the invention has now been described in detail. In addition, however, many changes and modifications can be made to this preferred embodiment without departing from the nature and spirit of the invention.

For example, in FIGS. 2A–2C, the array 11 is shown as having four columns and sixteen rows. But as a modification, the array 11 can have any desired number of columns and any desired number of rows.

As a second modification, each component which is included in the data processing system of FIG. 1 can be implemented with a wide variety of circuits. For example, the microprocessor which is included in each of the nodes 12 can be as Intel Pentium® or as Intel 486™ or as Motorola 68XXX™. Similarly, each of the message routing circuits 10 can be implemented as described in patent application Ser. No. 08/118,164; U.S. Pat. No. 5,471,589; or it can be implemented as described in patent application Ser. No.08/ 236,439 U.S. Pat. No. 5,513,322. The former is entitled "Multiprocessor Data Processing System Having Nonsymetrical Channel (X) to Channel (Y) Interconnections"; and the latter is entitled "Multi-Path Message Routing Without Deadlocks." Likewise each bit-serial control above 31–33 can be implemented as an ether net channel or an RS422 channel.

As a third modification, the particular control signals which are sent by the control module 20 to the message routing circuits and data processing nodes as shown in FIGS. 4A–4C can be altered. For example, in FIG. 4C, two bytes or more can be provided in each node sub-string as a means for passing the configure node items 171, 181, etc. to respective data processing nodes. Similarly, in FIG. 4B, the steps 120–152 which selectively set the I/O port bits (i.e. disable selected I/O ports) can be deleted. With this modification, each data processing node will continue to limit the addresses in the messages which it sends due to the configure node items 171, 181, etc. which are stored in the nodes in the steps of FIG. 5C. But if an error occurs which corrupts some of the configure node items, then such an error will not be detected by the message routing circuits.

As a fourth modification, the array 11 as shown in FIG. 1 can be replicated two or more times; and these replicate arrays can then be aligned in parallel planes in which the message routing circuits at corresponding columns-row intersections are intercoupled with an input/output channel. By this modification, the resulting composite array, as well as each sub-array which is partitioned by the process steps of FIGS. 3 and 4A–4C, will be three dimensional.

Accordingly, it is to be understood that the present invention is not limited to just the illustrated preferred embodiment but is defined by the appended claims.

What is claimed is:

1. A data processing system which is comprised of:
 a plurality of message routing circuits that have input/output channels which are intercoupled to form an array, and a corresponding plurality of data processing nodes each of which has an input/output channel to a respective message routing circuit;
 each data processing node being adapted to send messages which address other data processing nodes, and each message routing circuit being adapted to pass said messages on said input/output channels to the addresses data processing nodes; wherein,
 said data processing system further includes an operator console for manually selecting a subset of said data processing nodes that are to comprise a sub-array, a control module connected to said operator console by a first control channel for receiving commands from said console which define said sub-array; a second control channel connected directly to every data processing node and a third control channel connected directly to every message routing circuit which carry control signals from said control module that cause said sub-array to form without any of said messages being passed on any of said input/output channels.

2. A data processing system according to claim 1 wherein said control module sends said control signals directly to said data processing nodes that prevent each node in one sub-array from sending messages to any node in another sub-array.

3. A data processing system according to claim 1 wherein said control module sends control signals directly to said message routing circuits that prevent the message routing circuit in each sub-array from passing messages to another sub-array.

4. A data processing system according to claim 1 wherein said control module sends control signals directly to said data processing nodes that select one node in each sub-array as a boot node which loads a separate operating system into each sub-array via a peripheral device which is coupled directly to said boot node.

5. A data processing system according to claim 1 wherein each data processing node within a particular sub-array stores control signals which define an address for the nodes within its particular sub-array, which is independent of where the sub-array is located within said array.

6. A data processing system according to claim 1 wherein each data processing node within a particular sub-array stores control signals which define address limits for messages from that node with said address limits being independent of where the sub-array is located within said array.

7. A data processing system according to claim 1 wherein the data processing nodes in each sub-array stores a table which correlates an address for each data processing node in the sub-array to processes which those data processing nodes perform.

8. A data processing system according to claim 1 wherein said message routing circuits within each sub-array set an error indicator if any message is received for another sub-array, and a control module is coupled to said message routing circuits for reading said error indicator.

9. A data processing system according to claim 1 wherein said message routing circuits within each sub-array have their input/output channels intercoupled in rows and columns that lie in a single plane.

10. A data processing system according to claim 1 wherein said message routing circuits within each sub-array have their input/output channels intercoupled in rows and columns that lie in multiple parallel planes.

11. A data processing system according to claim 2 wherein said control module also sends control signals directly to said data processing nodes that select one node in each sub-array as a boot node which loads a separate operating system into each sub-array via a peripheral device which is coupled directly to said boot node.

12. A data processing system according to claim 11 wherein said control module also sends control signals directly to said message routing circuits that prevent the message routing circuit in each sub-array from passing messages to another sub-array.

\* \* \* \* \*